US007577837B1

(12) United States Patent
Ithal et al.

(10) Patent No.: US 7,577,837 B1
(45) Date of Patent: Aug. 18, 2009

(54) METHOD AND APPARATUS FOR ENCRYPTED UNICAST GROUP COMMUNICATION

(75) Inventors: Ravishankar Ganesh Ithal, Fremont, CA (US); Ravi Gadde, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 724 days.

(21) Appl. No.: 10/418,877

(22) Filed: Apr. 17, 2003

(51) Int. Cl.
*H04L 29/06* (2006.01)

(52) U.S. Cl. .................. 713/163; 713/162; 713/150; 726/12; 380/149; 709/245; 709/225

(58) Field of Classification Search ............ 713/153, 713/163, 162, 150; 726/12; 380/149; 709/245, 709/225
See application file for complete search history.

(56) References Cited

U.S. PATENT DOCUMENTS

| | | | | |
|---|---|---|---|---|
| 5,602,916 | A * | 2/1997 | Grube et al. | 380/270 |
| 5,684,951 | A * | 11/1997 | Goldman et al. | 726/6 |
| 6,757,823 | B1 * | 6/2004 | Rao et al. | 713/153 |
| 6,766,451 | B1 * | 7/2004 | Van Rijnsoever | 713/160 |
| 6,889,321 | B1 * | 5/2005 | Kung et al. | 713/153 |
| 6,957,346 | B1 * | 10/2005 | Kivinen et al. | 713/153 |
| 6,996,841 | B2 * | 2/2006 | Kadyk et al. | 726/12 |
| 7,203,957 | B2 * | 4/2007 | Balissat et al. | 726/15 |
| 2002/0161905 | A1 * | 10/2002 | Haverinen et al. | 709/229 |
| 2003/0123665 | A1 * | 7/2003 | Dunstan et al. | 380/255 |
| 2003/0149874 | A1 * | 8/2003 | Balfanz et al. | 713/168 |
| 2004/0083360 | A1 * | 4/2004 | Walsh et al. | 713/160 |
| 2005/0091527 | A1 * | 4/2005 | Swander et al. | 713/201 |

OTHER PUBLICATIONS

Mark Baugher, et al., "The Group Domain of Interpretation," Internet Engineering Task Force, Internet-Draft, Dec. 2002, 38 pages.
S. Kent, et al., "Security Architecture for the Internet Protocol," Nov. 1998, Network Working Group, Request for Comments: 2401, http://www.ietf.org/rfc/rfc2401?number=2401, printed Jul. 25, 2003, pp. 1-62.
D. Maughan, et al., "Internet Security Association and Key Management Protocol (ISAKMP)," Nov. 1998, Network Working Group, Request for Comments: 2408, pp. 1-86.
D. Harkins, et al., "The Internet Key Exchange (IKE)," Nov. 1998, Network Working Group, Request for Comments: 2409, http://www.ietf.org/rfc/rfc2409.txt?number2409, printed Jul. 25, 2003, pp. 1-39.

* cited by examiner

*Primary Examiner*—Kambiz Zand
*Assistant Examiner*—Roderick Tolentino
(74) *Attorney, Agent, or Firm*—Hickman Palermo Truong & Becker LLP

(57) ABSTRACT

A process for managing encrypted group communication according to a single security association (SA) for network traffic from a sender includes receiving a request for an encrypted communication among a plurality of network devices. A common decryption key and a common security parameters index (SPI) are provided to each of the network devices participating in the communication. The common security parameters index facilitates locating, in respective databases associated with each of the network devices, security association information that is associated with the common security association. Information is encrypted based on the common security association, and unicasted to each of the network devices. In an embodiment, the common security parameters index provided to each network device is established by the sender. For example, the SPI is established by a conference server and sent to each device participating in a voice conference.

66 Claims, 4 Drawing Sheets

METHOD AND APPARATUS FOR ENCRYPTED UNICAST GROUP COMMUNICATION

FIELD OF THE INVENTION

The present invention generally relates to communication networks. The invention relates more specifically to a method and apparatus for encrypted unicast communication among network devices.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Unicast Versus Multicast Communication

Multicast refers to a technique for communicating between a single sender and multiple receivers over a network. Multicast can be used in a private network environment, such as a corporate LAN, or in a public network environment, such as the Internet wide area networks. For example, multicast is used on the Mbone (sometimes referred to as the Multicast Internet), a specific high-bandwidth subset of the Internet. The MBone includes known network elements such as routers and servers that are equipped to handle multicast protocols. Furthermore, multicast is one of the packet types supported in the Internet Protocol Version 6 (IPv6).

In contrast to multicast, unicast refers to a technique for communicating between a single sender and one or more receivers, point-to-point, over a network. Like multicast, unicast can also be used for high-bandwidth communications, such as video and sound programming and voice and video conferencing. However, unicast can be implemented using general-purpose network components and does not rely on special-purpose network elements, such as servers and intermediate gateways, as with multicast. In addition, multicast has several deployment issues with network service providers, such as accounting challenges and bandwidth provisioning. Hence, unicast is often a more appropriate and desired mechanism for communications over a public network than is multicast.

Secure Network Communication Protocol

Communications protocols exist that facilitate secure communication over a network. One such commonly used protocol is IPsec. The Security Architecture for the Internet Protocol and related protocols such as IKE and ISAKMP (collectively referred to herein as IPsec) provide a standards-based method of providing privacy, integrity, and authenticity to information transferred point-to-point among peers across IP networks, such as the public Internet wide area networks and private local area networks. Key management and security associations are negotiated with the Internet Key Exchange (IKE) protocol. Each security association (SA) is a set of IPsec parameters that have been negotiated between two devices, and which govern the security of network traffic between the devices. SAs are unidirectional, in that one SA is established for traffic from a first endpoint to a second endpoint, and another SA is established for traffic from the second endpoint to the first endpoint.

Security associations are typically stored at each network device that participates in secure communication using a network security protocol such as IPsec. For example, in the context of IPsec, security associations for secure connections negotiated by a given network device are stored in a Security Association Database (SAD) within the device. The SAs are uniquely identified by a receiver in an associated SAD by a combination of a Security Parameter Index (SPI), a Destination IP Address, and a relevant security protocol (such as AH or ESP).

Conventionally, a SPI is established by the receiver and sent back to the sender peer, as part of the IKE negotiation process between the sender and receiver. Subsequently, this SPI is sent in the ESP header of packets sent by the sender to the receiver, to facilitate identifying and locating the appropriate SA in the SAD of the receiver. This process is designed to avoid SPI conflicts at the receiver, based on the presumption that a receiver that establishes SPIs for its database will not establish identical SPIs for different independent SAs.

Some network applications and processes, such as encrypted voice conferences, operate efficiently in a hub-and-spoke arrangement. In such an arrangement, all traffic from each conference participant, or peer, traverses first to the hub and then back out to the other participants. In the voice conference context, the hub is a conference server that functions to mix all of the audio streams received from the conference participants (spokes) and to transmit the resultant audio stream to all the participants. With such an application, it is efficient to have multiple peers use a single common security policy. For example, a policy may be negotiated by the conference initiator and the conferencing server, and dictated or applied to each subsequent peer-to-peer connection between the conferencing server and the other conference participants.

In an environment in which a common security policy is used by multiple peers, such as with an encrypted voice conference, SAs that represent the common security policy are negotiated by the hub and each respective peer. For example, an IKE process is used to negotiate the SAs and associated keys. However, as part of the SA negotiation processes between the hub and the respective peers, different encryption/decryption key pairs are typically established for each hub-to-peer connection. Consequently, the hub is required to separately encrypt each packet stream that is sent out to each respective peer, which, in total, is a computationally expensive and inefficient process.

One approach to the foregoing scenario is use of the Group Domain of Interpretation (GDOI), an ISAMKP Domain of Interpretation for group key management. The GDOI manages group security associations, which are used by IPsec and potentially other security protocols running at the IP or application layers. However, GDOI is not applicable to unicast applications and applies only to secure multicast applications, of which practical disadvantages are described above.

Based on the foregoing, there is a clear need for a technique for secure unicast group communication. There is a more specific need for a technique for using a common key for all peers participating in a unicast group communication.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
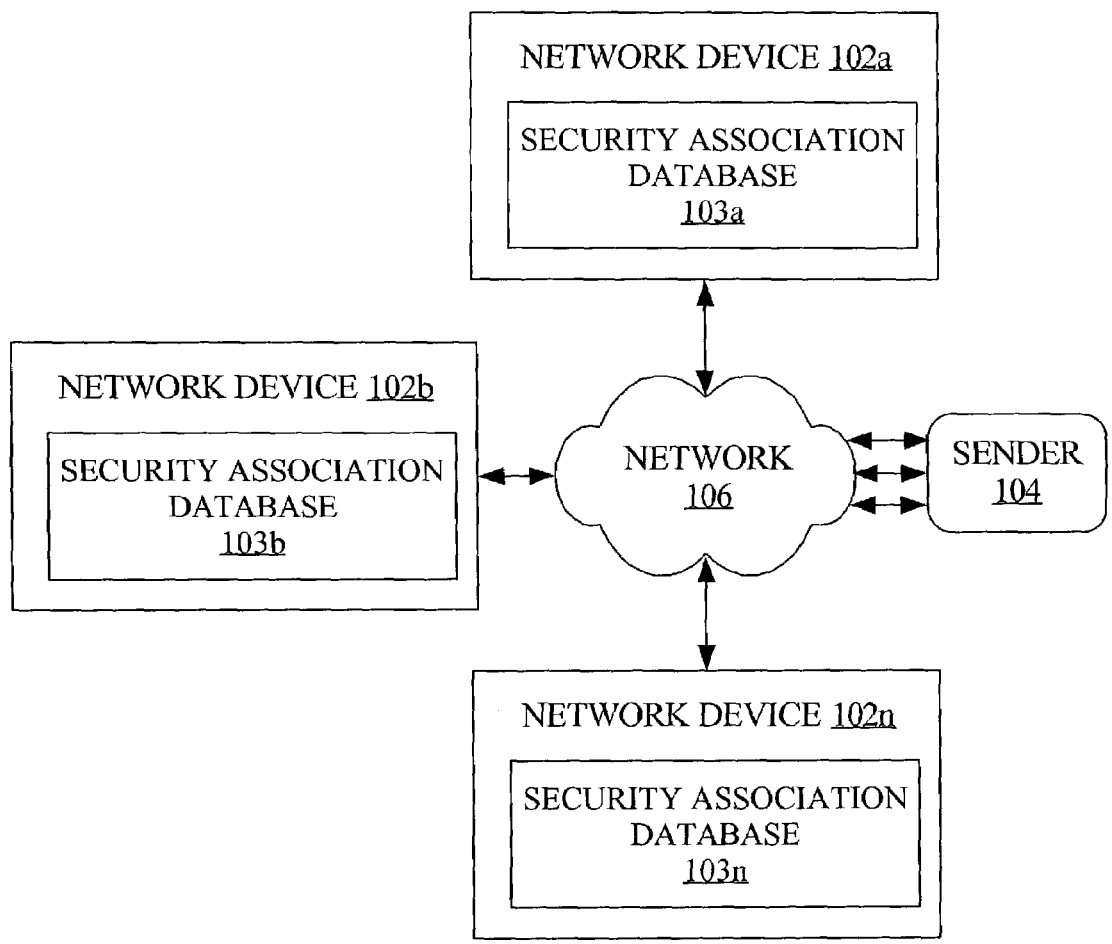
FIG. 1 is a block diagram of an example operating environment in which an embodiment may be implemented.

A method and apparatus for encrypted unicast group communication is disclosed. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0 | General Overview |
| 2.0 | Structural and Functional Overview |
| | 2.1 Operating Environment Example |
| 3.0 | Method For Encrypted Unicast Group Communication Among Network Devices |
| | 3.1 Process For Managing Encrypted Unicast Group Communication |
| | 3.2 Process For Participating In An Encrypted Unicast Group Communication |
| 4.0 | Implementation Mechanisms - Hardware Overview |
| 5.0 | Extensions and Alternatives |

1.0 GENERAL OVERVIEW

According to one aspect, a process for managing encrypted group communication among network devices according to a single security association (SA) for network traffic from a sender to the network devices, is described. A request for an encrypted communication among a plurality of network devices is received. A common decryption key and a common security parameters index (SPI) are provided to each of the network devices participating in the unicast communication. The common SPI facilitates locating, in respective databases associated with each of the network devices, security association information that is associated with the common security association. Information is encrypted based on the common security association, and transmitted to each of the network devices.

For example, a request for an encrypted voice conference is received at a conference server. An IPsec SA is negotiated by the conference requestor and the conference server. Similar SAs are negotiated with, or dictated to, other conference participants. A common SPI that indexes the respective SAs is provided to each participant in the encrypted voice conference. The common SPI is used by each participant to locate the appropriate SA in their IPsec Security Association Database (SAD). SA parameters associated with the common SA, located in respective participant databases, are employed along with the common decryption key to decrypt voice packets transmitted from the conferencing server.

In an embodiment, the common security parameters index provided to each network device is established by the sender. For example, the SPI is established by the conference server and sent to each participating network device, considered the receivers. Such a process differs from conventional IPsec implementations, in which the SPI is always established by the receiver in a point-to-point communication.

In embodiments, the common security parameters index and/or the common key is provided as part of an IPsec Quick Mode (QM) message. For example, Message 2 of a QM exchange may be used when communication is client-initiated, and Message 1 or Message 3 of a QM exchange may be used when communication is server-initiated. In embodiments, the common security parameters index and/or the common key is provided in a Vendor ID payload of an IPsec Quick Mode message.

According to one aspect, a process for participating in an encrypted unicast communication according to a common security association for network traffic from a sender to multiple network devices is described. A decryption key, which is provided to each of the network devices, is received at a network device. A security parameters index is received at the network device. The security parameters index is common to, and therefore provided to, each of the network devices for locating, in respective databases, security association information for the common security association. Information that is encrypted based on the common security association is received from the sender, which is decrypted using the received decryption key.

In an embodiment, the security association information is located in a database based on the received security parameters index. In another embodiment, the security association information is located by a network device in a database based on a four tuple comprising (1) the received security parameters index, (2) an indication of a security protocol associated with network traffic from the sender, (3) a network address associated with the network device, and (4) a network address associated with the sender. Including the network address of the sender as basis for locating the SA information provides an additional parameter for distinguishing the appropriate SA from other SAs in the database, thus avoiding the possibility of SPI conflicts at the network device.

For example, as part of a process of joining an encrypted voice conference, each participating network device receives the same decryption key and SPI from a conferencing server. Thus, upon receiving voice packets encrypted by the server based on a common SA, each participating network device is able to locate the appropriate SA information in a respective SAD and to use the received key to decrypt the encrypted voice packets based on the common SA information.

2.0 STRUCTURAL AND FUNCTIONAL OVERVIEW 2.1 Operating Environment Example

FIG. 1 is a block diagram of an example operating environment in which an embodiment may be implemented. An operating context that is used throughout this description for purposes of example is a voice conference. However, use of the techniques described herein is not limited to use in such a context. Generally, these techniques are applicable to secure, or encrypted, unicast communications among network devices, such as devices 102a, 102b, 102n. The communications are according to a common security association for network traffic from sender 104 to devices 102a, 102b, 102n functioning as receivers. Without use of a common key, sender 104 would have to encrypt traffic to each of devices 102a, 102b, 102n separately, based on separate decryption keys.

In FIG. 1, multiple network devices 102a, 102b, 102n are communicatively coupled to a sender 104 through a network 106. Network devices 102a, 102b, 102n and sender 104 may comprise any network device capable of communicating securely through implementation of a security protocol, such as the set of protocols collectively referred to as the IPsec protocols. For example, network devices 102a, 102b, 102n and sender 104 are IP phones, routers, switches, workstations, servers, and the like. In the context of unicast communication, sender 104 operates generally as a communication hub, from which network traffic is sent to one or more devices 102a, 102b, 102n.

Network 106 may contain any number of network infrastructure elements including routers, switches, gateways, etc. Such elements are omitted from FIG. 1 for clarity, because they are not pertinent to the embodiments described herein. In one embodiment, network 106 is a TCP/IP network in which infrastructure elements execute a conventional routing protocol for routing packets among the infrastructure elements. Although embodiments are described herein with reference to the TCP/IP protocol, implementations are not limited to use of TCP/IP. Rather, other network communication protocols, including protocols that are not yet developed, may be used to implement these techniques.

For example, devices 102a, 102b, 102n are packet-based hardware or software IP phones, sender 104 is a conference server and network 106 is the public Internet. In the context of unicast voice communication, sender 104 operates generally as a communication hub. At the sender 104, network traffic that is received from any of devices 102a, 102b, 102n is mixed and a resultant voice signal or series of packets is sent to devices 102a, 102b, 102n. One example of a conference server is Cisco Conference Connection from Cisco Systems, Inc. of San Jose, Calif.

Network devices 102a, 102b, 102n each comprise a respective security association database (SAD) 103a, 103b, 103n. Security association databases 103a, 103b, 103n are databases that store information or parameters associated with security associations (SA). SAs are negotiated between the network devices 102a, 102b, 102n and remote devices, such as sender 104, with which devices 102a, 102b, 102n securely communicate using a suitable security protocol. One such SAD 103a, 103b, 103n is an IPsec SAD, which is described in IETF (Internet Engineering Task Force) Request For Comment (RFC) 2401 entitled "Security Architecture for the Internet Protocol," available from the Network Working Group of the IETF and which is incorporated by reference in its entirety for all purposes as if fully set forth herein.

An SA is typically a unidirectional peer-to-peer concept, established to govern communication from one endpoint (the sender) to another endpoint (the receiver). Thus, for bi-directional communication between two endpoints, two SAs are established. Information stored in an SAD 103a, 103b, 103n in association with corresponding receiver SAs (SAs governing communication from a sender to a receiver) includes, for example, (1) the destination IP address associated with the IPsec receiver endpoint, such as any of devices 102a, 102b, 102n; (2) a Security Parameters Index (SPI), used for indexing an SA in an SAD; (3) an indication of the security protocol associated with network traffic from a sender peer to the IPsec receiver endpoint; (4) a network address associated with the sender, such as sender 104; and (5) parameters associated with communications based on the respective SA, such as parameters relating to the appropriate security protocol and mode, the encryption algorithm, the SA lifetime, key pairs, and the like.

3.0 METHOD FOR ENCRYPTED UNICAST GROUP COMMUNICATION AMONG NETWORK DEVICES

3.1 Process for Managing Encrypted Unicast Group Communication

Figure 2:
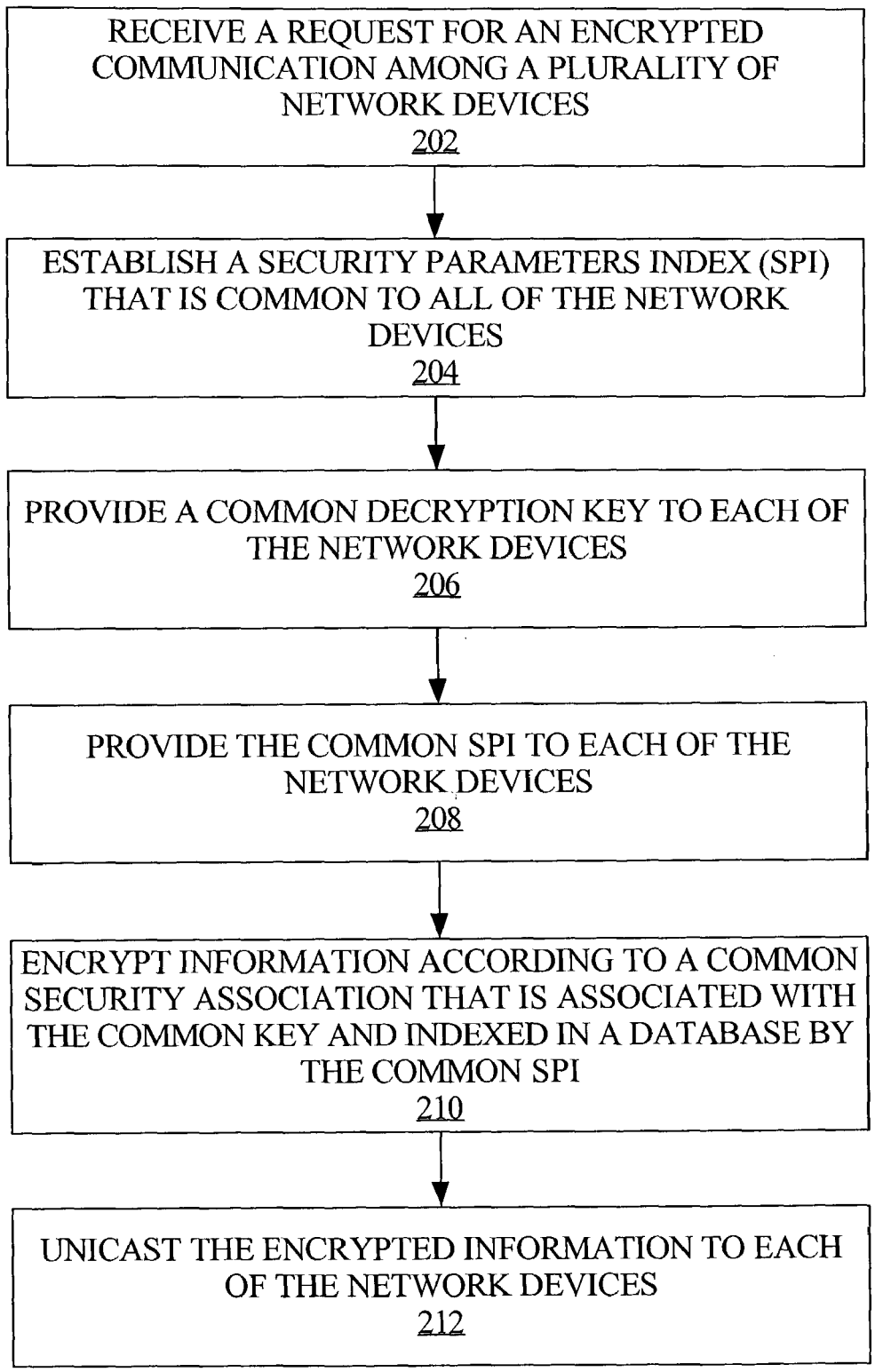
FIG. 2 is a flow diagram that illustrates a process for managing encrypted unicast group communication among network devices.

FIG. 2 is a flow diagram that illustrates a process for managing encrypted unicast group communication among network devices. According to an embodiment, a sender, such as sender 104, performs the process illustrated in FIG. 2. For example, in the context of an encrypted conference, a network component operating as a conference server performs the process.

At block 202, a request for an encrypted communication among a plurality of network devices is received. For example, a conference server in the position of sender 104 (FIG. 1) receives a request for a secure voice conference from network device 102a (FIG. 1). In an embodiment, the request is a request for a unicast communication that relies on IPsec for security. The network device from which the request originates is not important, therefore such a request could come from any network device that is capable of operating as a secure communication endpoint, or from a proxy for such a device.

In an embodiment, at optional block 204, a security parameters index (SPI) that is common to all the network devices is established. The SPI is associated with an SA that governs network traffic from the sender, such as sender 104, to one or more receivers, such as devices 102a, 102b, 102n. For example, a security policy and an associated SA are negotiated between network device 102a and sender 104. Sender 104 establishes a common SPI for all network devices participating in the unicast communication. Such a SPI is sent with packets from sender 104 and is used by each participant to locate, in an associated database such as SAD 103a, 103b, 103n, relevant security association parameters.

In the context of an encrypted conference, a security policy is negotiated by a conference initiator or requester, such as network device 102a functioning as an IPsec receiver, and the conference sender, such as a conference server functioning as an IPsec sender. As part of the policy negotiation process, the common SPI is established by the conference server operating as the sender 104.

With a single security policy for unicast communication, embodied in a single security association for traffic from sender 104 and any number of network devices 102a, 102b, 102n, sender 104 need only encrypt packets one time for transmission to all participating devices 102a, 102b, 102n. Included in the encrypted packets is the common SPI. In contrast, with conventional IPsec implementations the sender has to encrypt each packet stream according to each unique SA associated with each of multiple receivers. Hence, considerable processing overhead associated with multiple encryption processes is avoided when using the techniques described herein. Such a technique is in further contrast with conventional IPsec implementations, in which each receiver establishes a unique personal SPI rather than using a common shared SPI. Details regarding avoidance of SPI conflicts at the network devices 102a, 102b, 102n are described below in reference to FIG. 3.

At block 206, a common cryptographic, e.g., decryption, key is provided to each of the participating network devices.

For example, sender 104 provides a common key to each network device 102a, 102b, 102n. Devices 102a, 102b, 102n can use such a key to decrypt transmissions received from sender 104 according to the relevant security association. In the context of an encrypted conference, a conference server transmits a common key to each participating conference endpoint or receiver. The common cryptographic key may comprise multiple keys, for example, in cases in which the relevant encryption or authentication algorithm uses multiple keys. For example, a triple DES (Data Encryption Standard) encryption algorithm uses multiple keys.

In an embodiment, the common key is a shared private key. For example, the key could be a random number that is generated by a server, such as sender 104 (FIG. 1). For another example, the key could be the key from an authenticated Diffie-Hellman exchange between the sender 104 and the first client to join the group communication, such as network device 102a (FIG. 1), according to the IKE protocol.

In an embodiment, the common key is provided as part of an IPsec Quick Mode message. After an exchange of six messages associated with a Main Mode of an IKE process between two IPsec endpoints, in which authentication is completed, three subsequent messages are typically exchanged between the two endpoints as part of a second phase of the IKE process. This second phase is referred to as Quick Mode and functions as a key negotiation and exchange process. One of the three messages, namely a message from the sender to the receiver, contains the decryption key for decrypting traffic from the sender. The concepts of IKE Main Mode and Quick Mode are described in RFC 2409 entitled "The Internet Key Exchange (IKE)," available from the IETF, which is incorporated by reference for all purposes as if fully disclosed herein.

In an embodiment, the common key is provided in a Vendor ID (VID) payload of an IPsec Quick Mode message. The Vendor ID payload is described in RFC 2408 entitled "Internet Security Association and Key Management Protocol (ISAKMP)," available from the IETF, which is incorporated by reference for all purposes as if fully disclosed herein.

At block 208, the common SPI is provided to each of the participating network devices. For example, sender 104 includes the common SPI in packets to each network device 102a, 102b, 102n. Upon reception of packets encrypted according to the SA associated with the given SPI, with such packets including the SPI, devices 102a, 102b, 102n use the SPI to locate and access the associated security association parameters in their respective security association databases, such as SAD 103a, 103b, 103n. In the context of an encrypted conference, a conference server transmits the common SPI to each participating conference endpoint or receiver.

In an embodiment, the common SPI is provided as part of an IPsec Quick Mode message. One of the three Quick Mode messages, namely a message from the sender to the receiver, contains the SPI for indexing the appropriate parameters. In an embodiment, the common SPI is provided in a Vendor ID (VID) payload of an IPsec Quick Mode message.

At block 210, information is encrypted according to the common security association, which is associated with the common key provided at block 206 and indexed in a SAD by the common SPI provided at block 208. At block 212, the encrypted information is transmitted, or unicasted, to each network device participating in the unicast communication. For example, sender 104 encrypts packets with respective destination addresses of devices 102a, 102b, 102n and transmits the packets to such devices over the network 106 (FIG. 1). Such a transmission includes the SPI to facilitate the look-up of relevant parameters associated with the transmission. In turn, devices 102a, 102b, 102n are able to locate the appropriate SA in their respective databases 103a, 103b, 103n based on the common SPI. Therefore, devices 102a, 102b, 102n are able to decrypt the encrypted messages sent by sender 104.

Each of blocks 202, 206, 208 and 212 can be performed over the network 106, for example, the Internet.

In summary, a technique is provided for selection of an indexing mechanism by a sender of secured information, in which the indexing mechanism is common to all receivers of an encrypted unicast transmission from the sender. The indexing mechanism is used by the receivers to locate relevant parameters in respective databases, which are used in processing transmissions received from the sender. Hence, with use of a common security policy, security association, decryption key and SPI among multiple network device receivers, the sender need only encrypt transmissions to each of the multiple receivers in a single form. Consequently, less computational processing associated with encryption is required of the sender.

3.2 Process for Participating in an Encrypted Unicast Group Communication

Figure 3:
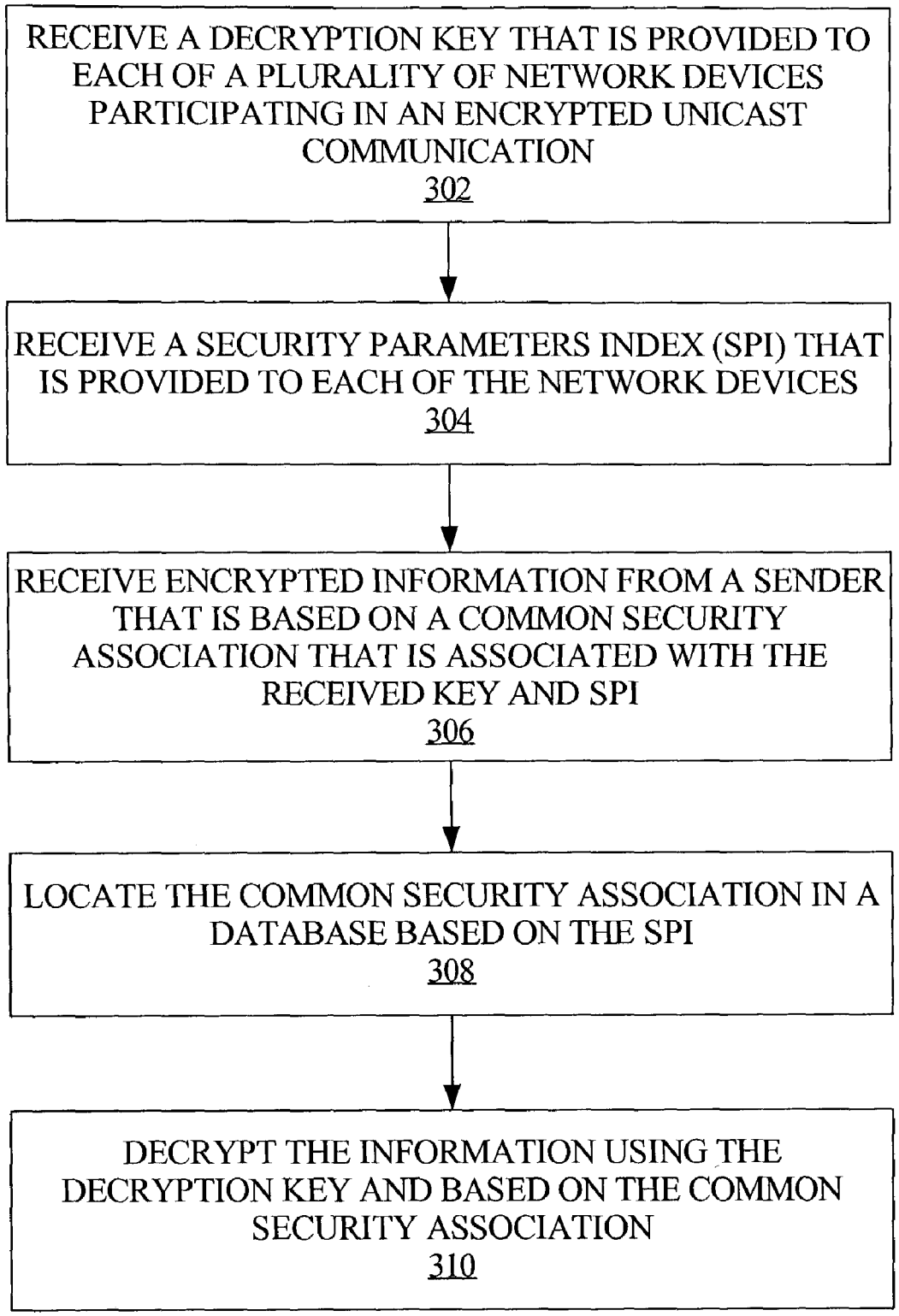
FIG. 3 is a flow diagram that illustrates a process for participating in an encrypted unicast group communication among network devices.

FIG. 3 is a flow diagram that illustrates a process for participating in an encrypted unicast group communication among network devices. According to an embodiment, receivers such as network devices 102a, 102b, 102n perform the process illustrated in FIG. 3. For example, in the context of an encrypted conference, participating conference endpoints perform the process. Examples of such endpoints are IP phones.

Subsequent to a request for a secure unicast communication, at block 302 a common decryption key is received. The common key is common to, and therefore received by, each of the participating network devices. In an embodiment, sender 104 provides a common key to each receiver network device 102a, 102b, 102n.

In an embodiment, the common key is received as part of an IPsec Quick Mode message. One of the three messages, namely a message from the sender to the receiver, contains the decryption key for decrypting traffic from the sender. In an embodiment, the common key is received in a Vendor ID (VID) payload of an IPsec Quick Mode message.

At block 304, a common SPI is received. The common SPI is common to, and therefore received by, each of the participating network devices. In an embodiment, each receiver network device 102a, 102b, 102 receives the common SPI from sender 104. Furthermore, in one embodiment, sender 104 establishes the common SPI. In the context of an encrypted conference, a conference server establishes and transmits the common SPI in packets to each participating conference endpoint or receiver.

In an embodiment, the common SPI is received as part of an IPsec Quick Mode message. One of the three Quick Mode messages, namely a message from the sender to the receiver, contains the SPI for indexing the appropriate parameters. In an embodiment, the common SPI is received in a Vendor ID (VID) payload of an IPsec Quick Mode message.

The receivers of the SPI, such as devices 102a, 102b, 102n, configure respective SADs 103a, 103b, 103n such that the single security association that governs unicast transmissions from the sender 104 is indexed therein by the common SPI.

At block 306, information is received from the sender, which is encrypted based on the common security association. The common security association is related to the common key received at block 302 and is indexed in an SAD by the common SPI received at block 304. For example, each network device 102a, 102b, 102n receives the same encrypted information with the same SPI from sender 104, with slightly different header information with respect to respective destination network or IP addresses. In the context of an encrypted voice conference, each participating device receives encrypted voice packets that comprise a voice signal that is constructed based on a plurality of signals received from respective conference endpoints.

As is typical, packets encoded according to IPsec protocols include the SPI to facilitate the look-up of relevant parameters associated with the traffic. At block 308, devices 102a, 102b, 102n are, therefore, able to locate the appropriate SA in respective databases 103a, 103b, 103n based on the common SPI.

In an embodiment, at block 308, a receiver locates the appropriate common security association in its SAD based on (1) the common SPI, (2) an indication of a security protocol associated with the network traffic from the sender to the network devices, (3) the network address of the destination device, which in this scenario, is the device doing the locating, and (4) the network address associated with the sender. Use of the elements (1)-(3) to locate an SA in an SAD is conventional with IPsec look-up processes. However, additionally using the sender or source address is not part of the conventional IPsec look-up process at the receiver.

Since, according to embodiments described herein, the sender endpoint establishes a common SPI for use with respect to multiple encrypted unicast transmissions, there is potential for conflicts at a receiver. Any given receiver might establish the same SPI for an SA that is unrelated to the common SA associated with the unicast communication from the sender. Hence, to provide an additional distinguishing element for identifying and locating an SA, the source address is also used to locate the appropriate SA in an SAD. Consequently, under the presumption that the sender does not establish duplicative SPIs for different SAs, there is no SPI conflict at any of the participating receivers. In IPsec implementations, the source IP address is conventionally included in an SAD field.

Using an additional database field to resolve the identity of and locate the appropriate SA does involve additional computations. Therefore, in an embodiment, additional logic is provided for receiver (e.g., destination) devices. The logic is such that when a conventional three-tuple lookup results in multiple hits, a four-tuple lookup is then performed that includes consideration of the source IP address. Hence, additional computations are minimized through selective use thereof.

In another embodiment, a range of SPIs (e.g., bits in the SPI field) is reserved for unicast group communications, such as those described herein. Sender 104 (FIG. 1), such as a conference server, is programmed to select SPIs for group communication from this reserved range. Additionally, when a client is communicating with another client using conventional IPsec, the client selects a SPI from outside of the reserved range. Hence, SPI conflicts are eliminated and additional computations to resolve the identity of and locate the appropriate SA are avoided.

At block 310, the information received at block 306 is decrypted using the common decryption key received at block 302, and according to the common security association located using the common SPI received at block 304.

Each of blocks 302, 304 and 306 can be performed through the network 106, for example, the Internet.

4.0 IMPLEMENTATION MECHANISMS

Hardware Overview

Figure 4:
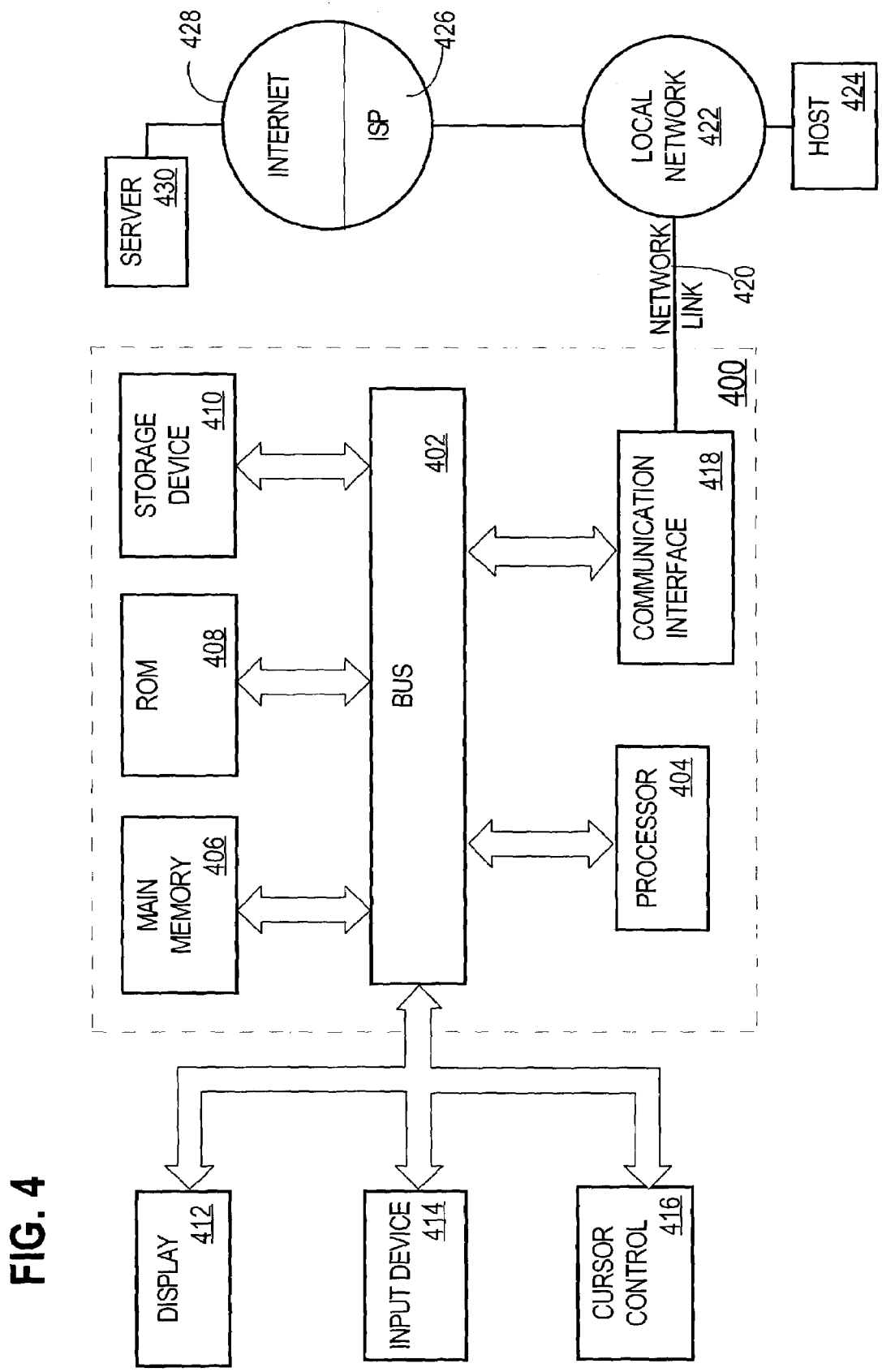
FIG. 4 is a block diagram that illustrates a computer system upon which an embodiment may be implemented.

FIG. 4 is a block diagram that illustrates a computer system 400 upon which an embodiment of the invention may be implemented. One aspect is implemented using one or more computer programs running on a network element such as a server. Accordingly, in that aspect the computer system 400 is a server computer. One aspect is implemented using one or more computer programs running on a network element such as a router device. Thus, according to that aspect, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for providing encrypted unicast communication among network devices. According to one embodiment of the invention, encrypted unicast communication is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for the techniques and functions that are described herein.

The received code may be executed by processor 404 as it is received, and/or stored in storage device 410, or other non-volatile storage for later execution. In this manner, computer system 400 may obtain application code in the form of a carrier wave.

5.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. For example, although embodiments of the invention are described in the context of IPsec, other similar secure communication protocols and associated databases can be used to implement the unicast communication techniques described herein. For another example, although embodiments of the invention are described in the context of an encrypted voice conference, other similar secure communications can benefit from implementation of the techniques described herein. The specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for managing encrypted unicast group communication among network devices according to a common security association for network traffic from a sender to each of the network devices, the method comprising the computer-implemented steps of:

receiving a request for an encrypted communication among a plurality of network devices;

wherein the request is received at a sender, operating as a communications hub, coupled to a plurality of the network devices, and from which traffic is sent on a plurality of separate unicast paths to respective network devices among the plurality of network devices;

providing a common decryption key to each of the network devices;

providing a common security parameters index to each of the network devices for locating, in respective databases associated with each of the network devices, security association information that is associated with the common security association;

encrypting information according to the common security association;

wherein the common security association, the common decryption key and the common security parameters index are common to each of the network devices participating in the unicast group communication and wherein the common decryption key comprises a shared private key; and unicasting the encrypted information from the sender to each of the network devices using the plurality of separate unicast paths.

2. The method of claim 1, wherein the steps are performed by the sender.

3. The method of claim 1, wherein the steps are performed by the sender, and the method further comprises the computer-implemented step of:

establishing the common security parameters index.

4. The method of claim 1, wherein the security association is based on IPsec protocols.

5. The method of claim 1, wherein the step of providing the common security parameters index includes providing the common security parameters index as part of an IPsec Quick Mode message.

6. The method of claim 1, wherein the step of providing the common security parameters index includes providing the common security parameters index in a Vendor ID payload of an IPsec Quick Mode message.

7. The method of claim 1, wherein the step of providing the common key includes providing the common key as part of an IPsec Quick Mode message.

8. The method of claim 1, wherein the step of providing the common key includes providing the common key in a Vendor ID payload of an IPsec Quick Mode message.

9. The method of claim 1, wherein the sender performs the step of transmitting the encrypted information and wherein at least one of the network devices uses a network address associated with the sender for locating the security association information in a database associated with the at least one network device.

10. The method of claim 9, wherein the at least one of the network devices further uses, for locating the security association information in the database:

the common security parameters index, an indication of a security protocol associated with the network traffic from the sender to the network devices, and a network address associated with the at least one of the network devices.

11. The method of claim 1, wherein the unicast communication among the network devices is a voice conference.

12. The method of claim 1, wherein the sender is a conference server communicatively coupled to the plurality of network devices.

13. The method of claim 12, wherein the plurality of network devices are IP phones.

14. A method for participating in an encrypted unicast group communication among network devices according to a common security association for network traffic from a sender to the network devices, the method comprising the computer-implemented steps of:

receiving a decryption key that is provided to each of the network devices;

wherein the network devices are coupled to a sender, operating as a communications hub, and from which the decryption key and other traffic is received on a plurality of separate unicast paths by respective ones of the network devices;

receiving a security parameters index that is provided to each of the network devices, wherein the security parameters index is for locating, in a respective database associated with each of the network devices, security association information that is associated with the common security association;

receiving encrypted information from the sender that is based on the common security association;

locating the security association information in a database based on the security parameters index;

wherein the common security association, the decryption key and the security parameters index are common to each of the network devices participating in the unicast group communication and wherein the decryption key comprises a shared private key; and decrypting the encrypted information using the decryption key and based on the security association information.

15. The method of claim 14, wherein the decryption key and the security parameters index are received from the sender.

16. The method of claim 14, further comprising the computer-implemented steps of:

locating, by a network device of the network devices, the security association information in a database based on the security parameters index, an indication of a security protocol associated with the network traffic from the sender to the network devices, a network address associated with the network device that is locating the information, and a network address associated with the sender.

17. The method of claim 14, wherein each of the steps are performed by each of the network devices participating in the encrypted unicast communication.

18. The method of claim 14, wherein the received security parameters index is established by the sender.

19. The method of claim 18, wherein the sender is a conference server communicatively coupled to the network devices through a public network.

20. The method of claim 19, wherein at least one of the network devices is an IP phone.

21. The method of claim 14, wherein the security association is based on IPsec protocols.

22. The method of claim 14, wherein the step of receiving the decryption key includes receiving the decryption key as part of an IPsec Quick Mode message.

23. The method of claim 14, wherein the step of receiving the decryption key includes receiving the decryption key in a Vendor ID payload of an IPsec Quick Mode message.

24. The method of claim 14, wherein the step of receiving the security parameters index includes receiving the security parameters index as part of an IPsec Quick Mode message.

25. The method of claim 14, wherein the step of receiving the security parameters index includes receiving the security parameters index in a Vendor ID payload of an IPsec Quick Mode message.

26. The method of claim 14, wherein the unicast communication is a voice conference.

27. A computer-readable medium carrying one or more sequences of instructions for managing encrypted unicast group communication among network devices according to a common security association for network traffic from a sender to each of the network devices, which instructions, when executed by one or more processors, cause the one or more processors to carry out the steps of:

receiving a request for an encrypted communication among a plurality of network devices;

wherein the request is received at a sender, operating as a communications hub, coupled to a plurality of the network devices, and from which traffic is sent on a plurality of separate unicast paths to respective network devices among the plurality of network devices;

providing a common decryption key to each of the network devices;

providing a common security parameters index to each of the network devices for locating, in respective databases associated with each of the network devices, security association information that is associated with the common security association;

encrypting information according to the common security association;

wherein the common security association, the common decryption key and the common security parameters index are common to each of the network devices participating in the unicast group communication and wherein the common decryption key comprises a shared private key; and unicasting the encrypted information from the sender to each of the network devices using the plurality of separate unicast paths.

28. The computer-readable medium of claim 27, wherein the instructions, when executed by one or more processors, cause the one or more processors to carry out the step of:
establishing, by the sender, the common security parameters index.

29. The computer-readable medium of claim 27, wherein the security association is based on IPsec protocols.

30. The computer-readable medium of claim 27, wherein the instructions cause the one or more processors to carry out the step of providing the common security parameters index by providing the common security parameters index as part of an IPsec Quick Mode message.

31. The computer-readable medium of claim 27, wherein the instructions cause the one or more processors to carry out the step of providing the common security parameters index by providing the common security parameters index in a Vendor ID payload of an IPsec Quick Mode message.

32. The computer-readable medium of claim 27, wherein the instructions cause the one or more processors to carry out the step of providing the common key by providing the common key as part of an IPsec Quick Mode message.

33. The computer-readable medium of claim 27, wherein the instructions cause the one or more processors to carry out the step of providing the common key by providing the common key in a Vendor ID payload of an IPsec Quick Mode message.

34. The computer-readable medium of claim 27, wherein the unicast communication among the network devices is a voice conference.

35. The computer-readable medium of claim 27, wherein the sender is a conference server communicatively coupled to the plurality of network devices.

36. The computer-readable medium of claim 35, wherein the plurality of network devices are IP phones.

37. A computer-readable medium carrying one or more sequences of instructions for participating in an encrypted unicast group communication among network devices according to a common security association for network traffic from a sender to the network devices, which instructions, when executed by one or more processors, cause the one or more processors to carry out the steps of:
receiving a decryption key that is provided to each of the network devices;
wherein the network devices are coupled to a sender, operating as a communications hub, and from which the decryption key and other traffic is received on a plurality of separate unicast paths by respective ones of the network devices;
receiving a security parameters index that is provided to each of the network devices, wherein the security parameters index is for locating, in a respective database associated with each of the network devices, security association information that is associated with the common security association;
receiving encrypted information from the sender that is based on the common security association;
locating the security association information in a database based on the security parameters index;
wherein the common security association, the decryption key and the security parameters index are common to each of the network devices participating in the unicast group communication and wherein the decryption key comprises a shared private key; and
decrypting the encrypted information using the decryption key and based on the security association information.

38. The computer-readable medium of claim 37, wherein the instructions cause the one or more processors to carry out the steps of:
locating, by a network device of the network devices, the security association information in a database based on
  the security parameters index,
  an indication of a security protocol associated with the network traffic from the sender to the network devices,
  a network address associated with the network device that is locating the information, and
  a network address associated with the sender.

39. The computer-readable medium of claim 37, wherein each of the steps are performed by each of the network devices participating in the encrypted unicast communication.

40. The computer-readable medium of claim 37, wherein the received security parameters index is established by the sender.

41. An apparatus for managing encrypted unicast group communication among network devices according to a common security association for network traffic from a sender to each of the network devices, the apparatus comprising:
means for receiving a request for an encrypted communication among a plurality of network devices;
wherein the request is received at a sender, operating as a communications hub, coupled to a plurality of the network devices, and from which traffic is sent on a plurality of separate unicast paths to respective network devices among the plurality of network devices;
means for providing a common decryption key to each of the network devices;
means for providing a common security parameters index to each of the network devices for locating, in respective databases associated with each of the network devices, security association information that is associated with the common security association;
means for encrypting information according to the common security association;
wherein the common security association, the common decryption key and the common security parameters index are common to each of the network devices participating in the unicast group communication and wherein the common decryption key comprises a shared private key; and means for unicasting the encrypted information from the sender to each of the network devices using the plurality of separate unicast paths.

42. The apparatus of claim 41, further comprising:
means for establishing, by the sender, the common security parameters index.

43. The apparatus of claim 41, wherein the security association is based on IPsec protocols.

44. The apparatus of claim 41, wherein the means for providing the common security parameters index includes means for providing the common security parameters index as part of an IPsec Quick Mode message.

45. The apparatus of claim 41, wherein the means for providing the common security parameters index includes means for providing the common security parameters index in a Vendor ID payload of an IPsec Quick Mode message.

46. The apparatus of claim 41, wherein the means for providing the common security parameters index includes means for providing the common security parameters index as part of an IPsec Quick Mode message.

47. The apparatus of claim 41, wherein the means for providing the common security parameters index includes means for providing the common security parameters index in a Vendor ID payload of an IPsec Quick Mode message.

48. The apparatus of claim 41, wherein the unicast communication among the network devices is a voice conference.

49. The apparatus of claim 41, wherein the apparatus is a conference server, operating as the sender, communicatively coupled to the plurality of network devices.

50. The apparatus of claim 49, wherein the plurality of network devices are IP phones.

51. An apparatus for participating in an encrypted unicast group communication among network devices according to a common security association for network traffic from a sender to the network devices, the apparatus comprising:
means for receiving a decryption key that is provided to each of the network devices;
wherein the network devices are coupled to a sender, operating as a communications hub, and from which the decryption key and other traffic is received on a plurality of separate unicast paths by respective ones of the network devices;
means for receiving a security parameters index that is provided to each of the network devices, wherein the security parameters index is for locating, in a respective database associated with each of the network devices, security association information that is associated with the common security association;
means for receiving encrypted information from the sender that is based on the common security association;
means for locating the security association information in a database based on the security parameters index;
wherein the common security association, the decryption key and the security parameters index are common to each of the network devices participating in the unicast group communication and wherein the decryption key comprises a shared private key; and
means for decrypting the encrypted information using the decryption key and based on the security association information.

52. The apparatus of claim 51, further comprising:
means for locating, by a network device of the network devices, the security association information in a database based on
the security parameters index,
an indication of a security protocol associated with the network traffic from the sender to the network devices,
a network address associated with the network device that is locating the information, and
a network address associated with the sender.

53. The apparatus of claim 51, wherein the means for receiving a security parameters index includes means for receiving a security parameters index established by the sender.

54. A device that can manage encrypted unicast group communication among network devices according to a common security association for network traffic from a sender to each of the network devices, the device comprising:
a network interface;
a processor coupled to the network interface and receiving network messages from the network through the network interface;
a computer-readable medium comprising one or more stored sequences which, when executed by the processor, cause the processor to carry out the steps of:
receiving a request for an encrypted communication among a plurality of network devices;
wherein the request is received at the device, operating as a communications hub, coupled to a plurality of the network devices, and from which traffic is sent on a plurality of separate unicast paths to respective network devices among the plurality of network devices;
providing a common decryption key to each of the network devices;
providing a common security parameters index to each of the network devices for locating, in respective databases associated with each of the network devices, security association information that is associated with the common security association;
encrypting information according to the common security association;
wherein the common security association, the common decryption key and the common security parameters index are common to each of the network devices participating in the unicast group communication and wherein the common decryption key comprises a shared private key; and
unicasting the encrypted information from the device to each of the network devices using the plurality of separate unicast paths.

55. The device of claim 54, wherein the instructions cause the one or more processors to carry out the steps of:
establishing, by the sender, the common security parameters index.

56. The device of claim 54, wherein the security association is based on IPsec protocols.

57. The device of claim 54, wherein the instructions cause the one or more processors to carry out the step of providing the common security parameters index by providing the common security parameters index as part of an IPsec Quick Mode message.

58. The device of claim 54, wherein the instructions cause the one or more processors to carry out the step of providing the common security parameters index by providing the common security parameters index in a Vendor ID payload of an IPsec Quick Mode message.

59. The device of claim 54, wherein the instructions cause the one or more processors to carry out the step of providing the common security parameters index by providing the common security parameters index as part of an IPsec Quick Mode message.

60. The device of claim 54, wherein the instructions cause the one or more processors to carry out the step of providing the common security parameters index by providing the common security parameters index in a Vendor ID payload of an IPsec Quick Mode message.

61. The device of claim 54, wherein the unicast communication among the network devices is a voice conference.

62. The device of claim 54, wherein the device is a conference server, operating as the sender, communicatively coupled to the plurality of network devices.

63. The device of claim 62, wherein the plurality of network devices are IP phones.

64. A device that can participate in an encrypted unicast group communication among network devices according to a common security association for network traffic from a sender to the network devices, the device comprising:
 a network interface;
 a processor coupled to the network interface and receiving network messages from the network through the network interface;
 a computer-readable medium comprising one or more stored sequences which, when executed by the processor, cause the processor to carry out the steps of:
  receiving a decryption key that is provided to each of the network devices;
  wherein the network devices are coupled to a sender, operating as a communications hub, and from which the decryption key and other traffic is received on a plurality of separate unicast paths by respective ones of the network devices;
  receiving a security parameters index that is provided to each of the network devices, wherein the security parameters index is for locating, in a respective database associated with each of the network devices, security association information that is associated with the common security association;
  receiving encrypted information from the sender that is based on the common security association;
  wherein the common security association, the decryption key and the security parameters index are common to each of the network devices participating in the unicast group communication and wherein the decryption key comprises a shared private key;
  locating the security association information in a database based on the security parameters index; and
  decrypting the encrypted information using the decryption key and based on the security association information.

65. The device of claim 64, wherein the instructions cause the one or more processors to carry out the step of:
 locating, by a network device of the network devices, the security association information in a database based on the security parameters index,
  an indication of a security protocol associated with the network traffic from the sender to the network devices,
  a network address associated with the network device that is locating the information, and
  a network address associated with the sender.

66. The device of claim 64, wherein the instructions cause the one or more processors to carry out the step of receiving a security parameters index by receiving a security parameters index established by the sender.

\* \* \* \* \*